(12) United States Patent
Lai

(10) Patent No.: US 7,445,397 B1
(45) Date of Patent: Nov. 4, 2008

(54) HEIGHT ADJUSTABLE ACCESSORY STRUCTURE

(76) Inventor: Yu-Shan Lai, No. 632, Sec. 1, Shih Hsien Rd., Chiayi City (TW)

(*) Notice: Subject to any disclaimer, the term of this patent is extended or adjusted under 35 U.S.C. 154(b) by 0 days.

(21) Appl. No.: 11/735,000

(22) Filed: Apr. 13, 2007

(51) Int. Cl.
*F16B 7/10* (2006.01)
*A47C 1/10* (2006.01)
(52) U.S. Cl. ............... 403/109.1; 403/109.8; 403/379.6; 297/391; 297/410
(58) Field of Classification Search ............. 297/391, 297/410; 403/109.1–109.8, 289, 379.1, 379.2, 403/379.6
See application file for complete search history.

(56) References Cited

U.S. PATENT DOCUMENTS 3,019,042 A * 1/1962 Smith .................. 403/202

\* cited by examiner

*Primary Examiner*—Victor MacArthur
(74) *Attorney, Agent, or Firm*—Alan Kamrath; Kamrath & Associates PA

(57) ABSTRACT

A height adjustable accessory structure includes a C-shaped ring disposed in an engaging sleeve including a main sleeve body and an assistant sleeve body engaged with each other for allowing insertion and positioning of an engaging rod with a plurality of engaging portions. The bottom of the engaging rod includes a tightening section and an engaging member whose size is between the outer diameter and the inner diameter of the engaging sleeve. The tightening section allows free deformation of elastic hooks at the bottom of the engaging sleeve, thus allowing the elastic hooks to successfully pass through the sleeve and enabling the elastic hooks to be positioned below the engaging sleeve after inserting through the sleeve. The engaging member will be stopped against the engaging sleeve, and the engaging rod cannot be pulled away from the engaging sleeve.

2 Claims, 6 Drawing Sheets

US 7,445,397 B1

HEIGHT ADJUSTABLE ACCESSORY STRUCTURE

BACKGROUND OF THE INVENTION

1. Field of the Invention

The present invention relates to a height adjustable accessory structure. In a preferred form shown, a C-shaped ring is disposed in an engaging sleeve including a main sleeve body and an assistant sleeve body engaged with each other for allowing insertion and positioning of an engaging rod with a plurality of engaging portions. The bottom of the engaging rod includes a tightening section and an engaging member whose size is between the outer diameter and the inner diameter of the engaging sleeve. The tightening section allows free deformation of the elastic hooks at the bottom of the engaging sleeve, thus allowing the elastic hooks to successfully pass through the sleeve and enabling the elastic hooks to be positioned below the engaging sleeve after inserting through the sleeve. After the engaging sleeve is engaged with the sleeve, the engaging member can be stopped against the elastic hooks, thus preventing the engaging rod from being pulled away from the engaging sleeve and avoiding the problem of unexpected disengagement of the engaging rod during operation.

2. Description of the Prior Art

Height adjustable structure is a structure that can offer the height adjustable function. This height adjustable design makes mass produced products suitable for different users with different body forms. Therefore, height adjustable structure is very important.

In a conventional height adjustable accessory structure with an engaging rod and an engaging sleeve, the engaging sleeve is inserted in a sleeve so as to allow the engaging rod to be inserted into the engaging sleeve. A, C-shaped ring is located inside the engaging sleeve to engage with the engaging section of the engaging rod to carry out step adjustment (in a conventional engaging sleeve, there is also an elastic piece made by plastic molding to offer a clamping force, but the plastic material is likely to lose elasticity and become brittle, so relevant discussions will be omitted here.). The conventional height adjustable accessory structure is easy to operate, but its cost is high, since the C-shaped ring of the engaging sleeve is difficult to manufacture, so that it can be accepted by the general manufacturer. Since an annular groove must be preformed in the inner wall of the engaging sleeve and the C-shaped ring will be positioned with the annular groove after elastic deformation, the manufacturing process is very difficult, and the C-shaped ring is likely to disengage or be damaged during the assembly process. Additionally, lacking any structure between the engaging rod and the engaging sleeve for preventing disengagement, the whole rod can be pulled out by an improper force, thus causing inconveniences in operation.

The present invention has arisen to mitigate and/or obviate the afore-described disadvantages.

SUMMARY OF THE INVENTION

The present invention relates to a height adjustable accessory structure including a C-shaped ring disposed in an engaging sleeve including a main sleeve body and an assistant sleeve body engaged with each other for allowing insertion and positioning of an engaging rod with a plurality of engaging portions. The bottom of the engaging rod includes a tightening section and an engaging member whose size is between the outer diameter and the inner diameter of the engaging sleeve. The tightening section allows free deformation of the elastic hooks at the bottom of the engaging sleeve, thus allowing the elastic hooks to successfully pass through the sleeve and enabling the elastic hooks to be positioned below the engaging sleeve after inserting through the sleeve. Hence, it can offer the following efficiencies:

1. since the engaging sleeve includes a main sleeve body and an assistant sleeve body engaged with each other, the C-shaped ring can be easily first positioned in the sleeve during the engaging process, thus achieving the objectives of quick assembly, not damaging the C-shaped ring and reducing the manufacturing cost.

2. the bottom of the engaging rod of the present invention includes a tightening section and an engaging member whose size is between the outer diameter and the inner diameter of the engaging sleeve. Thus when the engaging sleeve is being engaged with the sleeve, the engaging member will be limited at the engaging rod under the sleeve. Since the engaging member will be stopped against the engaging sleeve, the whole engaging rod cannot be pulled away from the engaging sleeve by an improper force, thus offering a safe and stable operation.

DETAILED DESCRIPTION OF THE PREFERRED EMBODIMENTS

The present invention will be more clear from the following description when viewed together with the accompanying drawings, which show, for purpose of illustration only, the preferred embodiment in accordance with the present invention.

Figure 1:
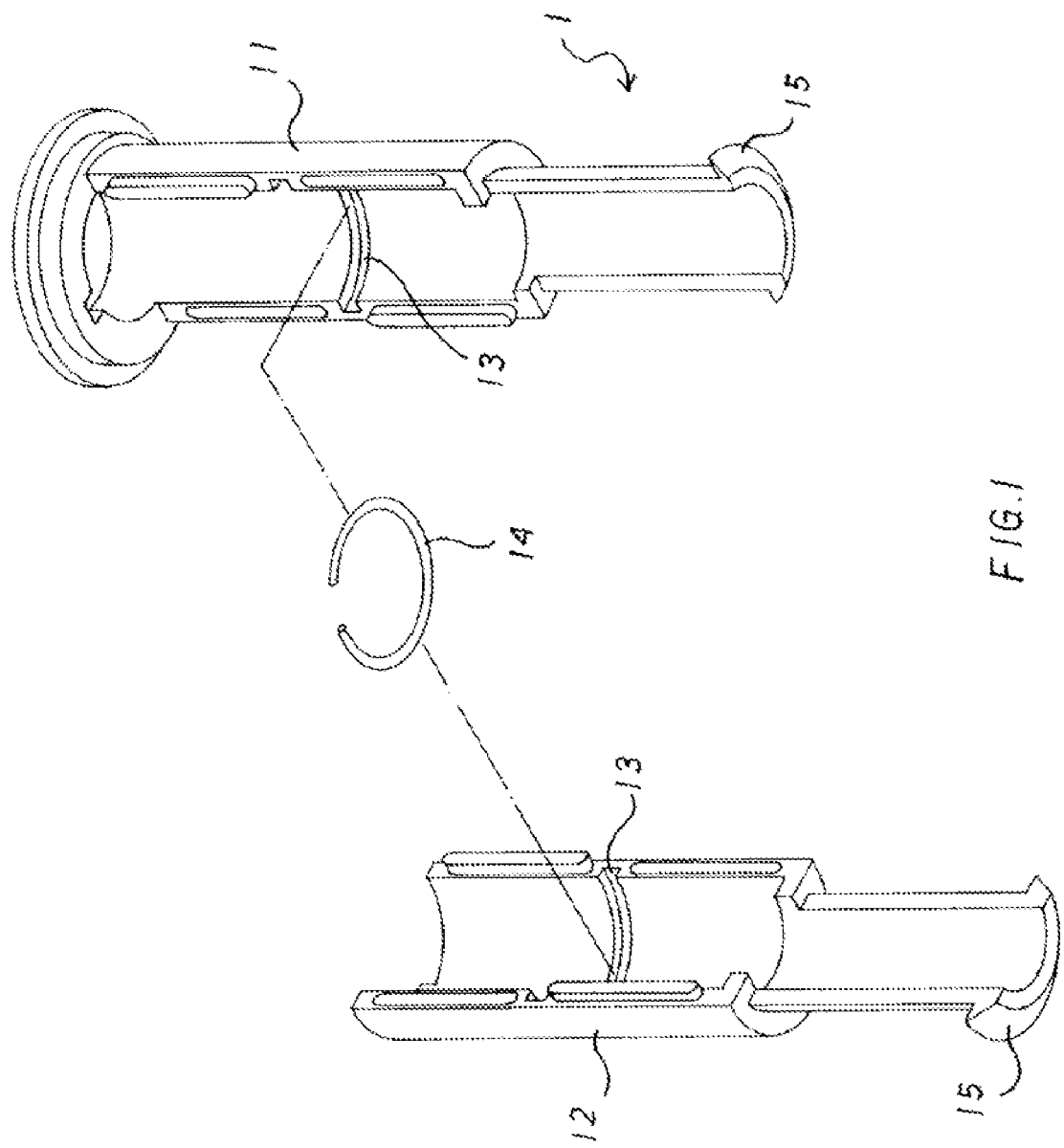
FIG. 1 is a structural view of an engaging sleeve in accordance with the present invention.
Figure 2:
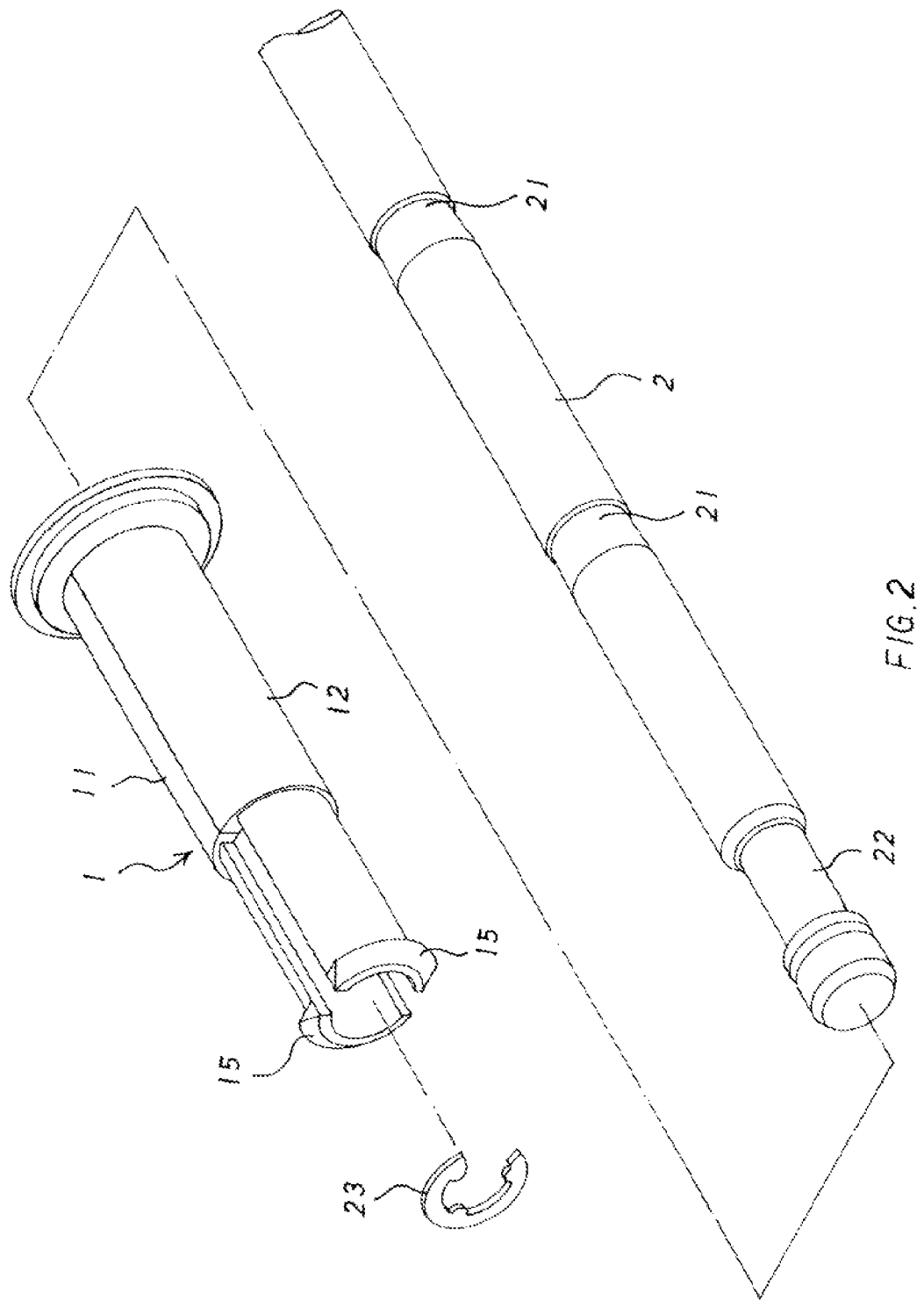
FIG. 2 is a structural view of the engaging sleeve and an engaging rod in according with the present invention.
Figure 3:
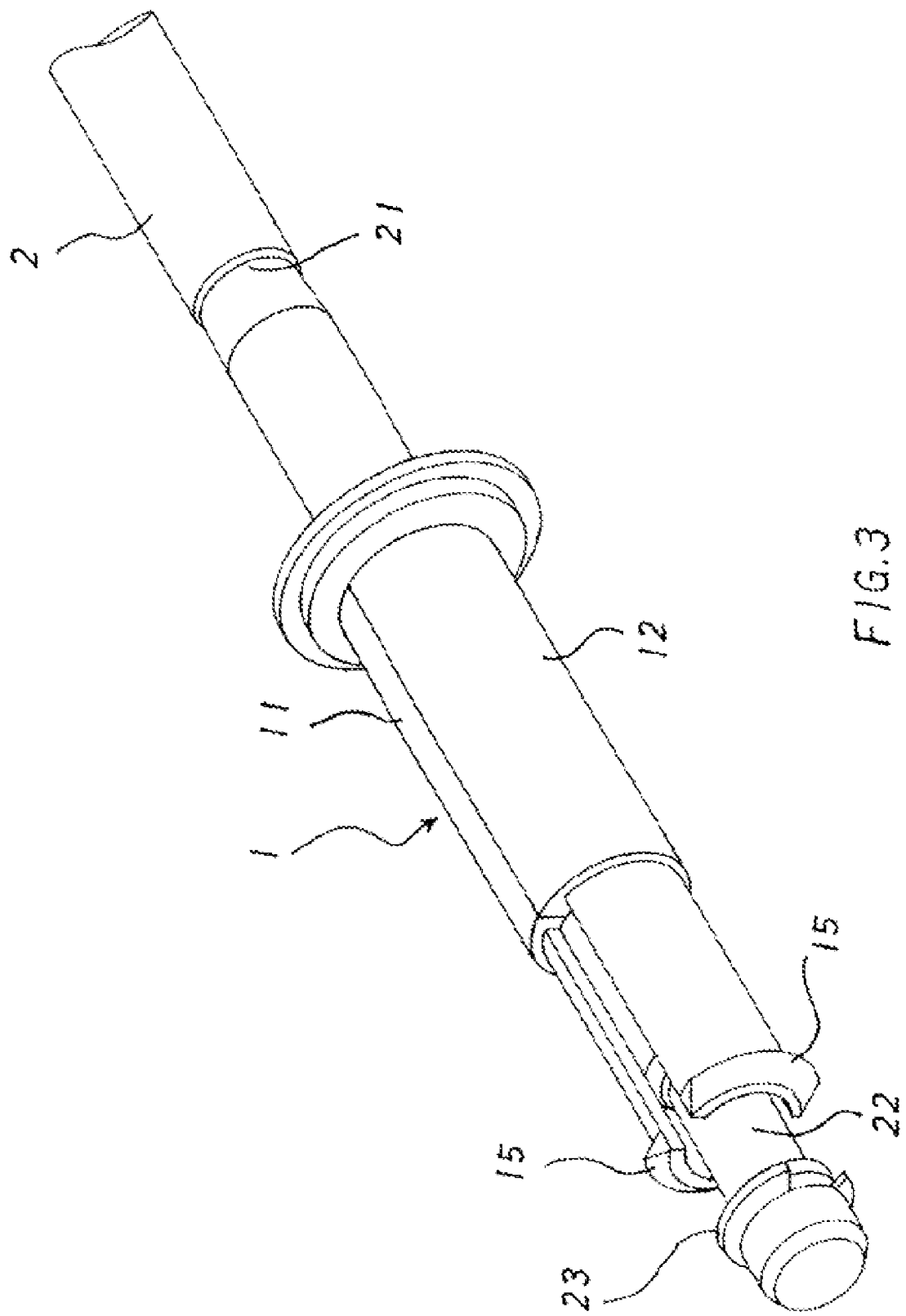
FIG. 3 is a perspective view showing the engaging sleeve combined with the engaging rod.
Figure 4:
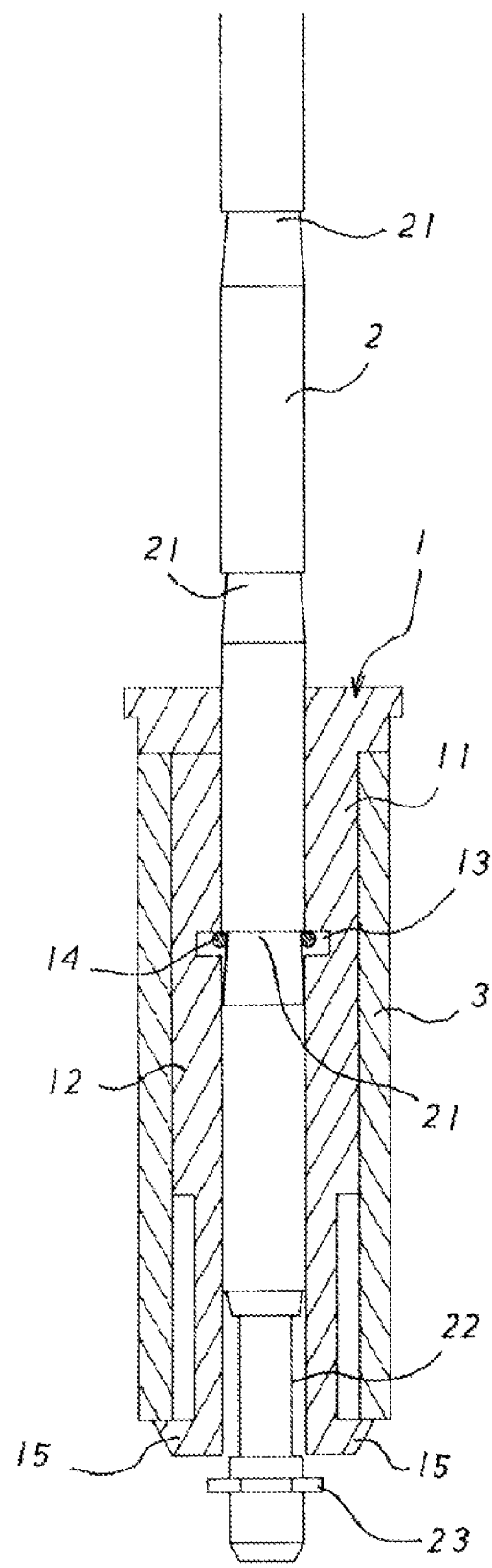
FIG. 4 is a cross sectional view of a height adjustable accessory structure in accordance with the present invention.
Figure 5:
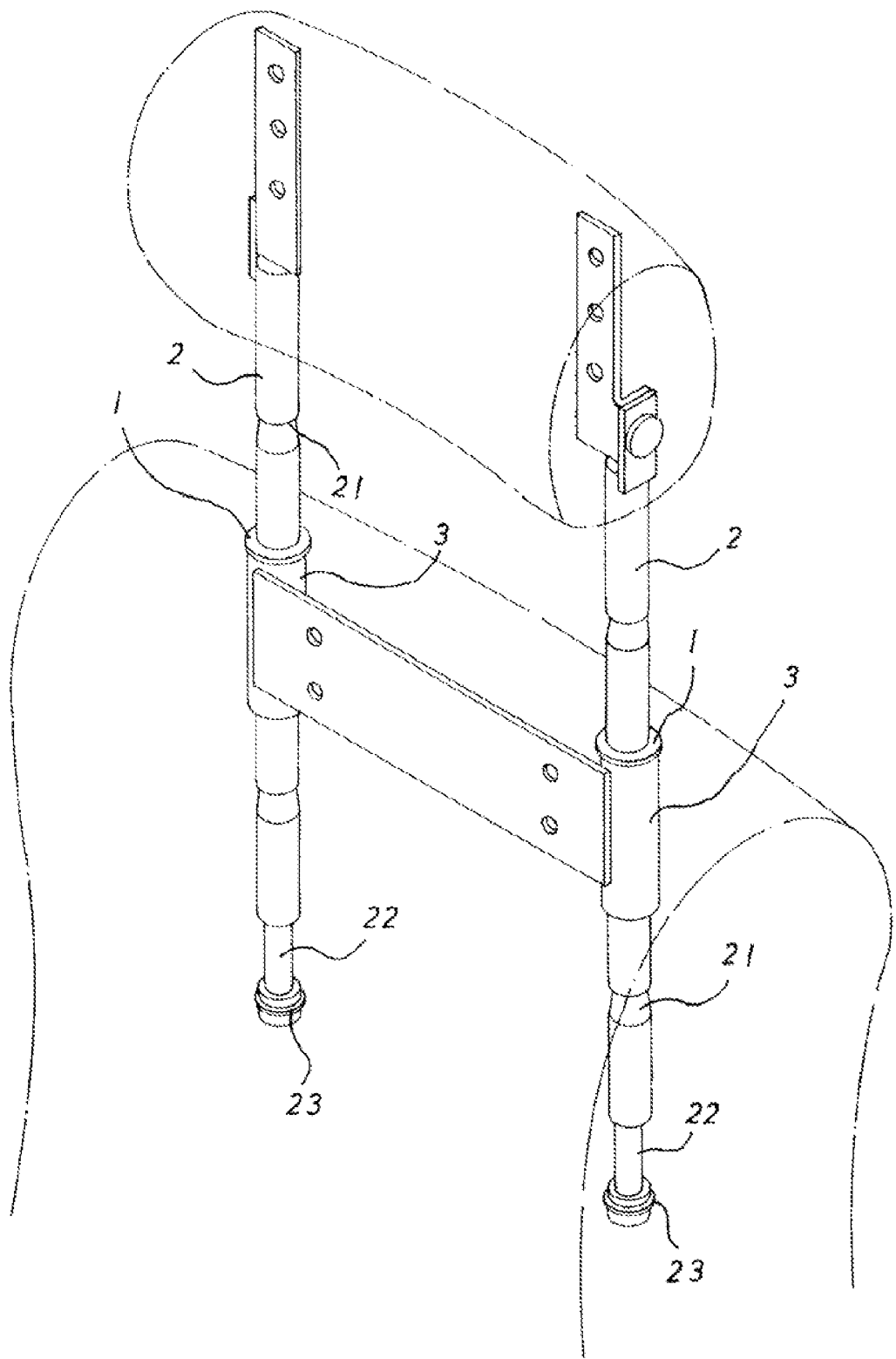
FIG. 5 is a perspective view showing the height adjustable accessory structure applied on a chair pillow in accordance with the present invention.

Referring to FIGS. 1-3, a height adjustable accessory structure comprises an engaging sleeve 1, an engaging rod 2 and a sleeve 3. The engaging sleeve 1 includes a main sleeve body 11 and an assistant sleeve body 12 engaged with each other. In the inner surface of each of the main sleeve body 11 and the assistant sleeve body 12 is formed an annular groove 13 for an accommodation of a C-shaped ring 14. Each of the main and assistant sleeve bodies 11, 12 has an elastic hook 15 located at both sides of the bottom of the engaging sleeve 1 for providing a fastening effect by inserting through the sleeve 3. The engaging rod 2 is to be inserted in the engaging sleeve 1, and the C-shaped ring 14 is used to engage with any of a plurality of engaging portions 21 of the engaging 2, thus carrying out height adjustment.

As known from the abovementioned structure, the engaging sleeve 1 includes a main sleeve body 11 and an assistant sleeve body 12 engaged with each other, and in the inner surface of each of the main sleeve body 11 and the assistant sleeve body 12 is formed an annular groove 13. Hence, when the main sleeve body 11 is engaged with the assistant sleeve body 12, the C-shaped ring 14 can be positioned in the annular groove 13 thus making it easier to position the C-shaped ring 14 without damaging the elasticity of the C-shaped ring 14 and ensuring the C-shaped ring 14 has the optimal clamping force relative to the engaging portion 21 of the engaging rod 2 during the adjustment of the engaging rod 21 relative to the engaging sleeve 1 and enabling the height adjustment to be performed more stably.

Figure 6:
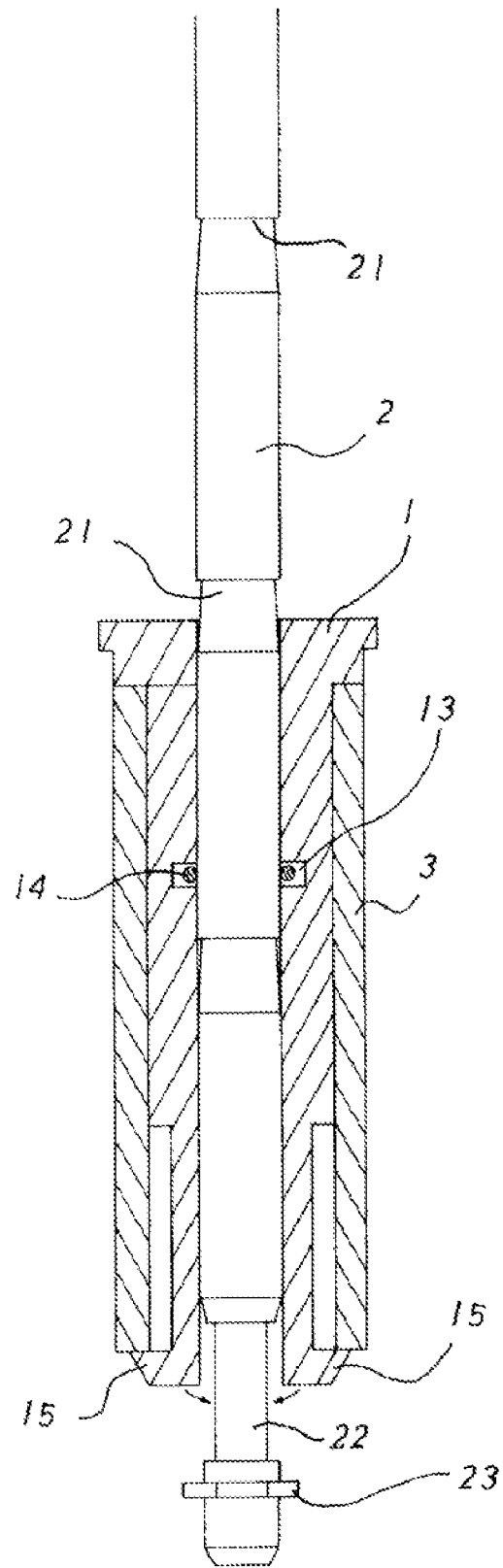
FIG. 6 shows that the elastic hook of the engaging sleeve is located correspondingly to the tightening section of the engaging rod in accordance with the present invention.

For preventing the engaging rod 2 from disengaging the from the engaging sleeve 1, the bottom of the engaging rod 2 of the present invention includes a tightening section 22 and an engaging member 23 whose size is between the outer diameter and the inner diameter of the engaging sleeve 1. The tightening section 22 allows free deformation of the elastic hooks 15 at the bottom of the engaging sleeve 1, thus allowing the elastic hooks 15 to successfully pass through the sleeve 3 (as shown in FIG. 6) and enabling the elastic hooks 15 to be positioned below the engaging sleeve 1 after inserting through the sleeve 3. Since the size of the engaging member 23 is between the inner diameter and the other diameter for the engaging sleeve 1, when the engaging rod 2 is pulled upwards relative to the engaging sleeve 1, the engaging member 23 located at the bottom of the engaging rod 2 will be stopped against the engaging sleeve 1. Consequently, the engaging rod 2 cannot be pulled away form the engaging sleeve 1.

While various embodiments in accordance with the present invention have been shown and described, it is clear to those skilled in the art that further embodiments may be made without departing from the scope of the present invention.

What is claimed is:

1. A height adjustable accessory structure operatively connecting a headrest to a seat, the accessory structure comprising: an engaging sleeve, an engaging rod and a sleeve; wherein the engaging sleeve includes a main sleeve body and an assistant sleeve body separably engaged with each other, a top side of the main sleeve body having an annular flange, an inner surface of each of the main sleeve body and the assistant sleeve body being formed with an inner annular groove, the annular groove accommodating a C-shaped ring that engages with a plurality of engaging portions of the engaging rod so as to provide a positioning effect after height adjustment, each of the main and assistant sleeve bodies being received within the sleeve and each having an elastic hook located at both sides of a bottom of the engaging sleeve, the engaging rod being inserted into the engaging sleeve with the hooks and the annular flange sandwiching the sleeve therebetween to provide a fastening effect, wherein the bottom of the engaging rod includes an outer annular groove that receives a C-shaped engaging member, the C-shaped engaging member preventing removal of the rod from the engaging sleeve.

2. The height adjustable accessory structure as claimed in claim 1, wherein the bottom of the engaging rod includes a tightening section and the C-shaped engaging member whose size is between an outer diameter and an inner diameter of the engaging sleeve, wherein the tightening section allows free deformation of the elastic hooks at the bottom of the engaging sleeve, thus allowing the elastic hooks to successfully pass through the sleeve and enabling the elastic hooks to be positioned below the engaging sleeve after inserting through the sleeve.

* * * * *